United States Patent
Sims, III

(10) Patent No.: US 9,715,878 B2
(45) Date of Patent: Jul. 25, 2017

(54) SYSTEMS AND METHODS FOR RESULT ARBITRATION IN SPOKEN DIALOG SYSTEMS

(71) Applicant: GM GLOBAL TECHNOLOGY OPERATIONS LLC, Detroit, MI (US)

(72) Inventor: Robert D. Sims, III, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/311,750

(22) Filed: Jun. 23, 2014

(65) Prior Publication Data

US 2015/0019225 A1    Jan. 15, 2015

Related U.S. Application Data

(60) Provisional application No. 61/845,798, filed on Jul. 12, 2013.

(51) Int. Cl.
*G10L 15/04* (2013.01)
*G10L 15/32* (2013.01)

(52) U.S. Cl.
CPC .................................. *G10L 15/32* (2013.01)

(58) Field of Classification Search
CPC ......... G10L 15/22; G10L 15/19; G10L 15/06; G10L 15/08; G10L 15/083; G10L 15/02; G10L 15/1815; G10L 15/183; G10L 15/197; G10L 15/20; G10L 15/26; G10L 15/28; G10L 15/30; G10L 17/00; G10L 2015/085; G10L 2015/088; G10L 15/32; G10L 15/265

USPC ....... 704/231, 233, 235, 236–240, 254, 255, 704/270, 270.1, 275
See application file for complete search history.

(56) References Cited

U.S. PATENT DOCUMENTS

| | | | |
|---|---|---|---|
| 5,566,272 A | 10/1996 | Brems et al. | |
| 6,697,782 B1* | 2/2004 | Iso-Sipila et al. | 704/275 |
| 7,228,275 B1* | 6/2007 | Endo et al. | 704/235 |
| 2005/0049864 A1* | 3/2005 | Kaltenmeier et al. | 704/233 |

(Continued)

FOREIGN PATENT DOCUMENTS

| | | |
|---|---|---|
| CN | 102074230 A | 5/2011 |
| CN | 102138175 A | 7/2011 |
| CN | 102292765 A | 12/2011 |

(Continued)

OTHER PUBLICATIONS

State Intellectual Property Office of the People's Republic of China, Office Action in Chinese Patent Application No. 201410329815.4 mailed Dec. 21, 2016.

*Primary Examiner* — Huyen Vo
(74) *Attorney, Agent, or Firm* — Lorenz & Kopf, LLP

(57) ABSTRACT

A method for arbitrating spoken dialog results includes receiving a spoken utterance from a user within an environment; receiving first recognition results and a first confidence level associated with the spoken utterance from a first source; receiving second recognition results and a second confidence level associated with the spoken utterance from a second source; receiving human-machine-interface (HMI) information associated with the user; selecting between the first recognition results and the second recognition results based on at least one of the first confidence level, the second confidence level, and the HMI information.

5 Claims, 3 Drawing Sheets

(56) References Cited

U.S. PATENT DOCUMENTS

2007/0156407 A1   7/2007   Schedl

FOREIGN PATENT DOCUMENTS

| CN | 102439660 A | 5/2012 |
| CN | 102543071 A | 7/2012 |
| CN | 103177721 A | 6/2013 |
| JP | 2007041319 A | 2/2007 |

\* cited by examiner

SYSTEMS AND METHODS FOR RESULT ARBITRATION IN SPOKEN DIALOG SYSTEMS

CROSS-REFERENCE TO RELATED APPLICATIONS

This application claims priority to U.S. Provisional Patent Application No. 61/845,798, filed Jul. 12, 2013, the contents of which are hereby incorporated by reference.

TECHNICAL FIELD

The technical field generally relates to speech systems, and more particularly relates to methods and systems for selecting between available speech recognition results.

BACKGROUND

Vehicle spoken dialog systems (or "speech systems") perform, among other things, speech recognition based on speech uttered by occupants of a vehicle. The speech utterances typically include commands that communicate with or control one or more features of the vehicle as well as other systems that are accessible by the vehicle. A speech system generates spoken commands in response to the speech utterances, and in some instances, the spoken commands are generated in response to the speech recognition needing further information in order to perform the speech recognition.

Increasingly, speech recognition functionality may be provided by multiple devices within the user's environment, as well as externally available servers. In the context of a vehicle spoken dialog system, for example, it is not unusual for speech recognition results to be available simultaneously from the user's mobile device (via one or more applications resident on the mobile device), the vehicle's onboard speech system, and external third-party servers (which are coupled via a network to an onboard communication network). Furthermore, the time necessary for the systems to produce speech recognition results as well as the confidence level associated with those results may vary greatly.

Accordingly, it is desirable to provide improved methods and systems for selecting or "arbitrating" speech recognition results in a speech system. Furthermore, other desirable features and characteristics of the present invention will become apparent from the subsequent detailed description and the appended claims, taken in conjunction with the accompanying drawings and the foregoing technical field and background.

DESCRIPTION OF THE DRAWINGS

The exemplary embodiments will hereinafter be described in conjunction with the following drawing figures, wherein like numerals denote like elements, and wherein.

BRIEF SUMMARY

A method for arbitrating spoken dialog results in accordance with one embodiment includes receiving a spoken utterance from a user within an environment; receiving first recognition results and a first confidence level associated with the spoken utterance from a first source; receiving second recognition results and a second confidence level associated with the spoken utterance from a second source; receiving human-machine-interface (HMI) information associated with the user; selecting between the first recognition results and the second recognition results based on at least one of the first confidence level, the second confidence level, and the HMI information.

A system for arbitrating spoken dialog results in a vehicle in accordance with one embodiment includes a semantic interpretation module, a short cut module, and a result selection module. The semantic interpretation module configured to receive a spoken utterance from a user within the environment, receive first recognition results and a first confidence level associated with the spoken utterance from a first source, and receive second recognition results and a second confidence level associated with the spoken utterance from a second source. The short cut module is configured to select the first recognition results when the first confidence level is above a threshold. The result selection module configured to select the first recognition results when the first confidence level is greater than the second confidence level and the first confidence level is not above the threshold.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
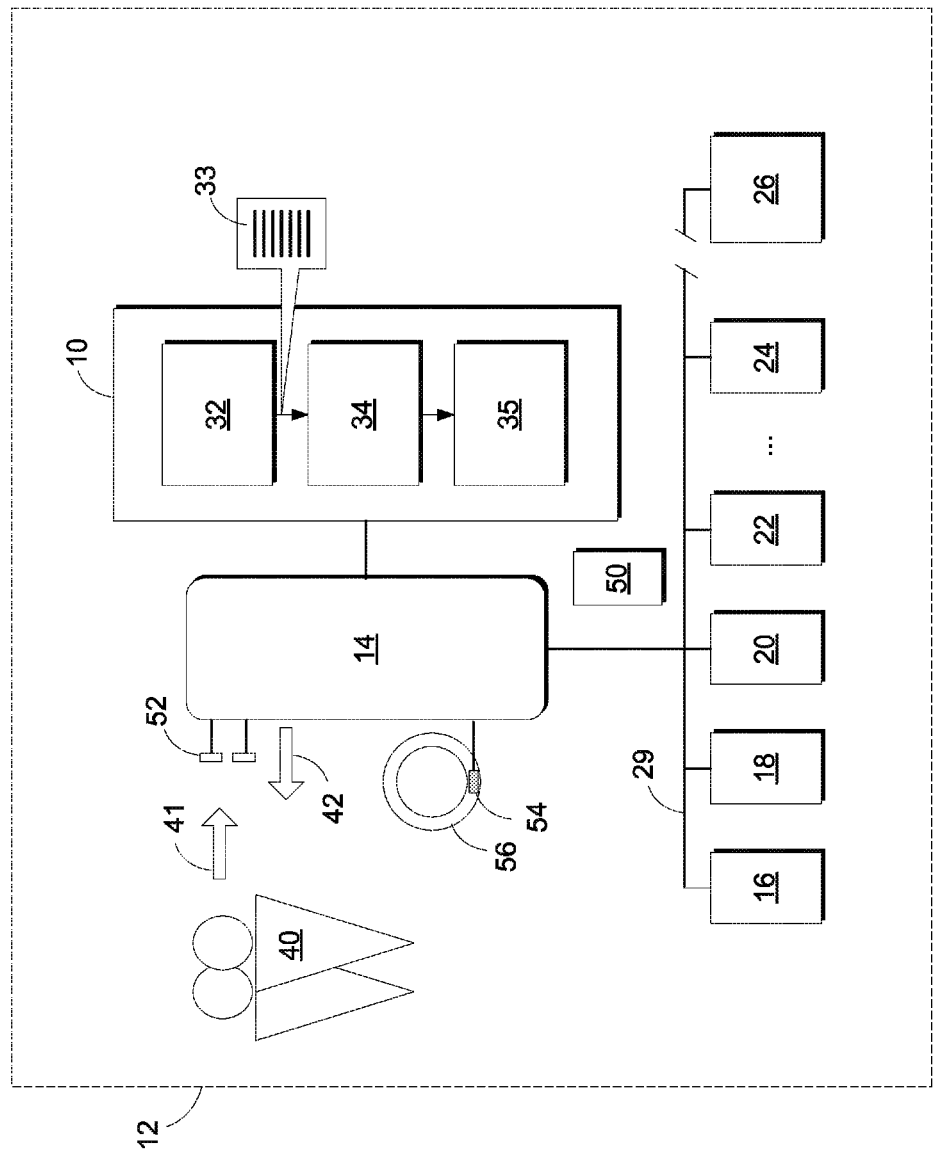
FIG. 1 is a functional block diagram of a vehicle including a speech system in accordance with various exemplary embodiments.

Referring now to FIG. 1, in accordance with exemplary embodiments of the subject matter described herein, a spoken dialog system (or simply "speech system") 10 is provided within a vehicle 12. In general, speech system 10 provides speech recognition, dialog management, and speech generation for one or more vehicle systems through a human machine interface module (HMI) module 14 configured to be operated by (or otherwise interface with) one or more users 40 (e.g., a driver, passenger, etc.). Such vehicle systems may include, for example, a phone system 16, a navigation system 18, a media system 20, a telematics system 22, a network system 24, and any other vehicle system that may include a speech dependent application. In some embodiments, one or more of the vehicle systems are communicatively coupled to a network (e.g., a proprietary network, a 4G network, or the like) providing data communication with one or more back-end servers 26.

One or more mobile devices 50 might also be present within vehicle 12, including various smart-phones, tablet computers, feature phones, etc. Mobile device 50 may also be communicatively coupled to HMI 14 through a suitable wireless connection (e.g., Bluetooth or WiFi) such that one or more applications resident on mobile device 50 are accessible to user 40 via HMI 14. Thus, a user 40 will typically have access to applications running on at three different platforms: applications executed within the vehicle systems themselves, applications deployed on mobile device 50, and applications residing on back-end server 26. Furthermore, one or more of these applications may operate in accordance with their own respective spoken dialog systems, and thus multiple devices might be capable, to varying extents, to respond to a request spoken by user 40.

Speech system 10 communicates with the vehicle systems 14, 16, 18, 20, 22, 24, and 26 through a communication bus and/or other data communication network 29 (e.g., wired, short range wireless, or long range wireless). The communication bus may be, for example, a controller area network (CAN) bus, local interconnect network (LIN) bus, or the like. It will be appreciated that speech system 10 may be used in connection with both vehicle-based environments and non-vehicle-based environments that include one or more speech dependent applications, and the vehicle-based examples provided herein are set forth without loss of generality.

As illustrated, speech system 10 includes a speech understanding module 32, a dialog manager module 34, and a speech generation module 35. These functional modules may be implemented as separate systems or as a combined, integrated system. In general, HMI module 14 receives an acoustic signal (or "speech utterance") 41 from user 40, which is provided to speech understanding module 32.

Speech understanding module 32 includes any combination of hardware and/or software configured to processes the speech utterance from HMI module 14 (received via one or more microphones 52) using suitable speech recognition techniques, including, for example, automatic speech recognition and semantic decoding (or spoken language understanding (SLU)). Using such techniques, speech understanding module 32 generates a result list (or lists) 33 of possible results from the speech utterance. In one embodiment, result list 33 comprises one or more sentence hypothesis representing a probability distribution over the set of utterances that might have been spoken by user 40 (i.e., utterance 41). List 33 might, for example, take the form of an N-best list. In various embodiments, speech understanding module 32 generates a list of results ("speech recognition results" or simply "results") 33 using predefined possibilities stored in a datastore. For example, the predefined possibilities might be names or numbers stored in a phone book, names or addresses stored in an address book, song names, albums or artists stored in a music directory, etc. In one embodiment, speech understanding module 32 employs front-end feature extraction followed by a Hidden Markov Model (HMM) and scoring mechanism. As described in further detail below, speech understanding module 32 may arbitrate between multiple speech recognition results received from multiple devices and/or systems to produce the final result list 33.

Dialog manager module 34 includes any combination of hardware and/or software configured to manage an interaction sequence and a selection of speech prompts 42 to be spoken to the user based on list 33. When a list contains more than one possible result, dialog manager module 34 uses disambiguation strategies to manage a dialog of prompts with the user such that a recognized result can be determined. In accordance with exemplary embodiments, dialog manager module 34 is capable of managing dialog contexts, as described in further detail below.

Speech generation module 35 includes any combination of hardware and/or software configured to generate spoken prompts 42 to a user 40 based on the dialog determined by the dialog manager 34. In this regard, speech generation module 35 will generally provide natural language generation (NLG) and speech synthesis, or text-to-speech (TTS).

Result list 33 includes one or more elements that represent a possible result. In various embodiments, each element of the list includes one or more "slots" that are each associated with a linguistic slot type depending on the application. For example, if the application supports making phone calls to phonebook contacts (e.g., "Call John Doe"), then each element may include slots with slot types of a first name, a middle name, and/or a last name. In another example, if the application supports navigation (e.g., "Go to 1111 Sunshine Boulevard"), then each element may include slots with slot types of a house number, and a street name, etc. In various embodiments, the slots and the slot types may be stored in a datastore and accessed by any of the illustrated systems. Each element or slot of the list 33 is associated with a confidence score.

In addition to spoken dialog, users 40 might also interact with HMI 14 through various buttons, switches, touch-screen user interface elements, gestures (e.g., hand gestures recognized by one or more cameras provided within vehicle 12), and the like. In one embodiment, a button 54 (e.g., a "push-to-talk" button or simply "talk button") is provided within easy reach of one or more users 40. For example, button 54 may be embedded within a steering wheel 56.

Figure 2:
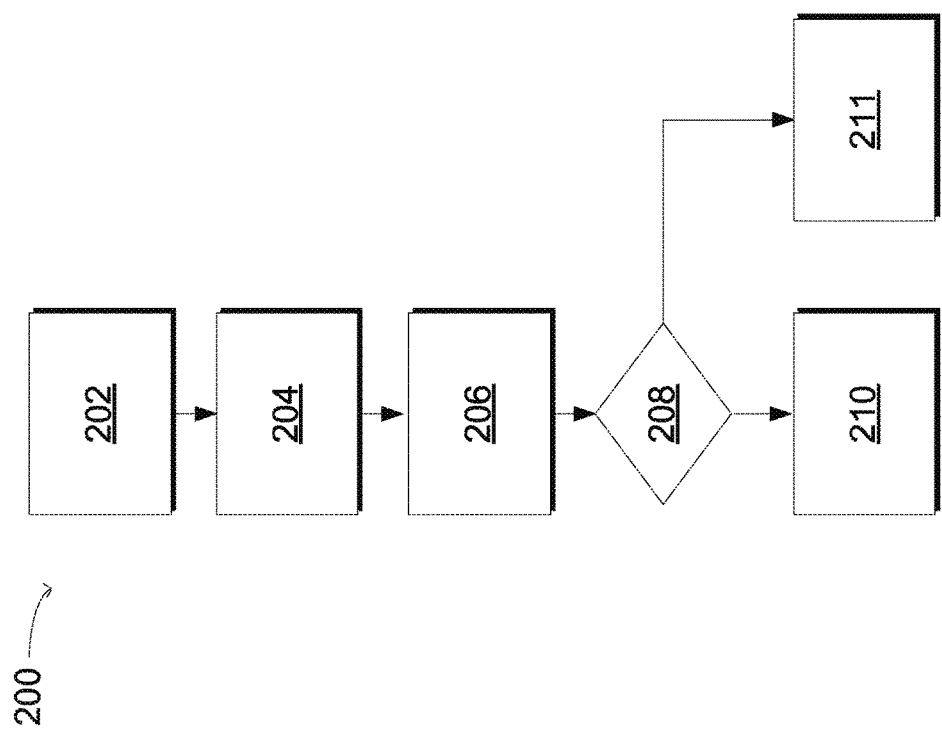
FIG. 2 is a flowchart depicting a method in accordance with one embodiment.
Figure 3:
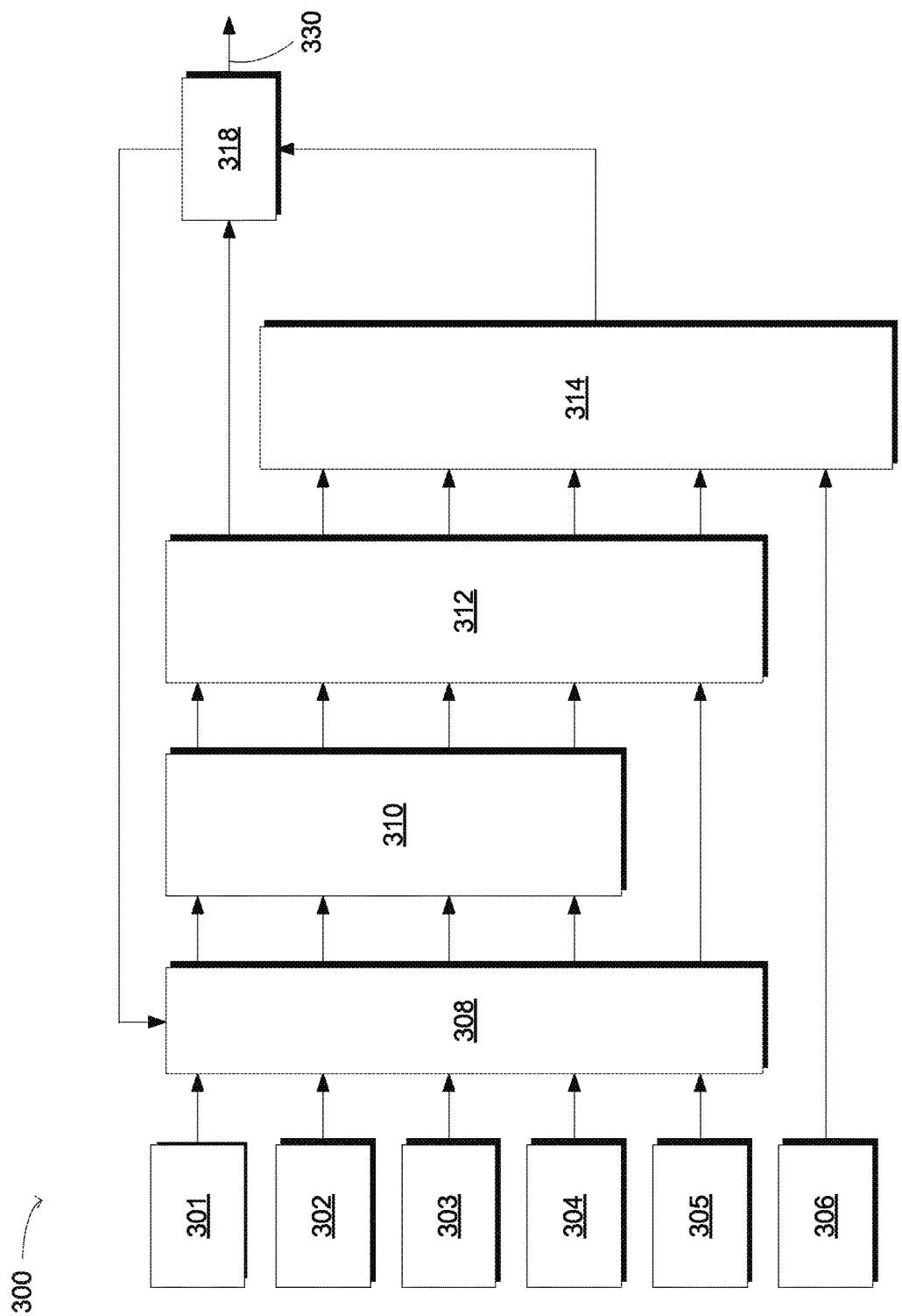
FIG. 3 is a functional block diagram illustrating a speech recognition arbitration system in accordance with exemplary embodiments.

Referring now to FIG. 3, a speech recognition arbitration system 300 in accordance with one embodiment will now be described in conjunction with an exemplary arbitration method 200 depicted in FIG. 2. In some embodiments, system 300 is implemented as part of speech understanding module 32 depicted in FIG. 1. In other embodiments, system 300 resides in one or more other modules depicted in FIG. 1.

In the illustrated embodiment, system 300 includes an event timer module 308, a semantic interpretation module 310, a short-cut module 312, a result selection module 314, current HMI state information 306, and an output module 318. Event timer module 308 is configured to accept multiple speech recognition results (or simply "results") 301-305 (step 202, FIG. 2). The speech recognition results 301-305 may be derived from multiple sources and/or might correspond to results produced through multiple speech recognition techniques. For example, results 301 might correspond to results produced through application of a statistical language model (SLM), while results 302 might correspond to results produced through application of a finite state grammar (FSG) to the same spoken utterance. Similarly, results 303 may be produced by an on-board (or "embedded") speech recognition system, such as a navigation system, while results 305 might be produced by an external server (e.g., server 26 in FIG. 1).

Event timer module 308 is configured to receive the various results 301-305 and determine the time that each of the results was received (step 204, FIG. 2). That is, for example, results 301 might be received 200 milliseconds (ms) after a specified time (e.g., the time that an utterance was submitted for interpretation), while results 305 (from an external server) might be received 3.0 seconds after the specified time.

Semantic interpretation module 310 is configured to receive the results 301-305 along with timing information from event timer module 308, and is configured to apply suitable methods to determine the dialog context and/or the various "slots" applicable to the received results, as described above (step 206, FIG. 2). That is, semantic interpretation module 310 is configured to determine the semantic meaning of the received results and also determine the confidence level for each interpretation. Semantic interpretation module 310 may also receive previously interpreted results from one or more sources, e.g., results 305 from an external server.

Short-cut module 312 is configured to receive the interpreted results from the various sources and determine (step 208) whether one of the interpreted results is of sufficiently high confidence (i.e., above a predetermined threshold). If so, that interpreted result is directly passed to output module 318 (step 210), thereby avoiding any delay that might be introduced by subsequent processing. The predetermined threshold may vary, as will be understood by someone of ordinary skill in the art, depending upon the nature of the results 301-305 as well semantic interpretation module 310.

If, at step 208, it is determined that none of the interpreted results have a confidence level above the predetermined threshold, then result selection module 314 selects between the interpreted results based on the confidence levels associated with each, along with HMI state information 306 (step 211, FIG. 2). In this regard, HMI state information 306 includes any information relating to the current operating mode of HMI 14 of FIG. 1. Such information might include, for example, the current screen on a touch screen, the status of any buttons (e.g., talk buttons) within the environment, whether the user is interacting with particular Internet hosts (e.g., Google Maps, Pandora, etc.), whether the user is interacting with media, the current dialog state, the content of what is being displayed to the user, information regarding the state of the vehicle (e.g., stationary or moving), and the like. The use of HMI state information 306 allows result selection module 314 to make a more intelligent selection. For example, if the user is interacting with Google Maps on an external server, then result selection module 314 would typically wait for external results 305 to be received, even if those results might be received later than the results from other sources (as it is clear that the user wishes to use results specifically from that service).

Output module 318 is configured to provide as an output the selected interpreted results 330 (i.e., either the short-cut results from shortcut module 312, or the selected results from result selection module 314). In this regard, results 330 might correspond to results list 33 illustrated in FIG. 1. Output module 318 is further configured to reset event timer module 308 (i.e., set the wait timer back to zero).

In accordance with one embodiment, historical data regarding the operation of system 300 is used to train the various components of system 300—e.g., update the models used for semantic interpretation module 310 and result selection module 314.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for arbitrating spoken dialog results in a vehicle, the system comprising:
   an event timer module, including a processor, configured to:
      receive, from a first source, first recognition results associated with a spoken utterance;
      receive, from a second source, second recognition results associated with the spoken utterance,
      determine a first time associated with when the first recognition results were received; and
      determine a second time associated with when the second recognition results were received;
   a semantic interpretation module, including a processor, configured to receive the first recognition results and determine a first confidence level associated with the first recognition results, to receive the second recognition results and determine a second confidence level associated with the second recognition results;
   a short cut module, including a processor, configured to determine whether the first confidence level is above a threshold and to provide the first recognition results to an output module if the first confidence level is above the threshold;
   a result selection module, including a processor, configured to select and provide to the output module the first recognition results when the first confidence level is not above the threshold, and the first confidence level is greater than the second confidence level wherein the result selection module is further configured to select the first recognition results based in part on the first time and the second time.

2. The system of claim 1, wherein the output module is configured to provide to the user the selected first recognition results and to provide a reset signal to the event timer module.

3. The system of claim 1, wherein each of the first recognition results includes one or more linguistic slots associated with corresponding slot types.

4. The system of claim 3, wherein the linguistic slot types include at least one of a proper name and an address.

5. The system of claim 1, wherein selecting between the first recognition results and the second recognition results by the result selection module includes selecting based on a Hidden Markov Model.

* * * * *